Figure 1:
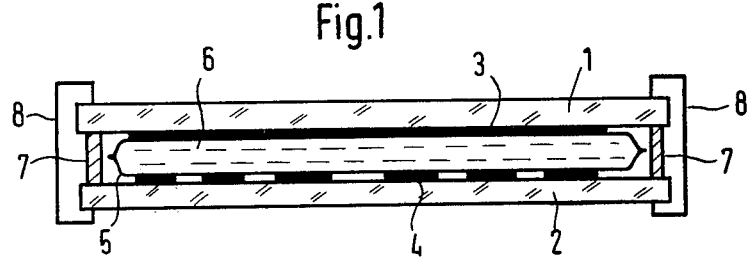

United States Patent [19]

Wessel et al.

[11] 4,256,383
[45] Mar. 17, 1981

[54] ELECTRO-OPTICAL DISPLAY

[75] Inventors: Gerhard Wessel, Stuttgart; Jürgen Pottharst, Stuttgart-Möhringen; Kurt Koger, Oberriexingen, all of Fed. Rep. of Germany

[73] Assignee: International Standard Electric Corporation, New York, N.Y.

[21] Appl. No.: 91,918

[22] Filed: Nov. 6, 1979

[30] Foreign Application Priority Data

Nov. 17, 1978 [DE] Fed. Rep. of Germany ....... 2849835

[51] Int. Cl.³ ............................................... G02F 1/01
[52] U.S. Cl. .................................... 350/343; 350/374; 350/267; 350/362; 428/1
[58] Field of Search ............... 350/267, 362, 343, 351, 350/339 R, 150; 428/1

[56] References Cited

U.S. PATENT DOCUMENTS

| 3,257,903 | 6/1966  | Marks        | 350/150 |
| 3,620,889 | 11/1971 | Baltzer      | 350/351 |
| 3,908,052 | 9/1975  | Sanders      | 428/1   |
| 3,967,882 | 7/1976  | Kubota et al.| 350/343 |
| 4,064,872 | 12/1977 | Caplan       | 350/351 |
| 4,071,912 | 2/1978  | Budmiger     | 350/150 |

*Primary Examiner*—R. A. Rosenberger
*Attorney, Agent, or Firm*—John T. O'Halloran; David M. Quinlan

[57] ABSTRACT

An electro-optical display is disclosed with two glass plates carrying electrodes and a liquid or semiliquid electro-optical material between them. The electro-optical material is encased in a flat bag of transparent plastic foils. Bags containing different electro-optical materials can be arranged between one pair of glass plates. Easy manufacturing of large-area displays. No seal is needed between the glass plates.

8 Claims, 4 Drawing Figures

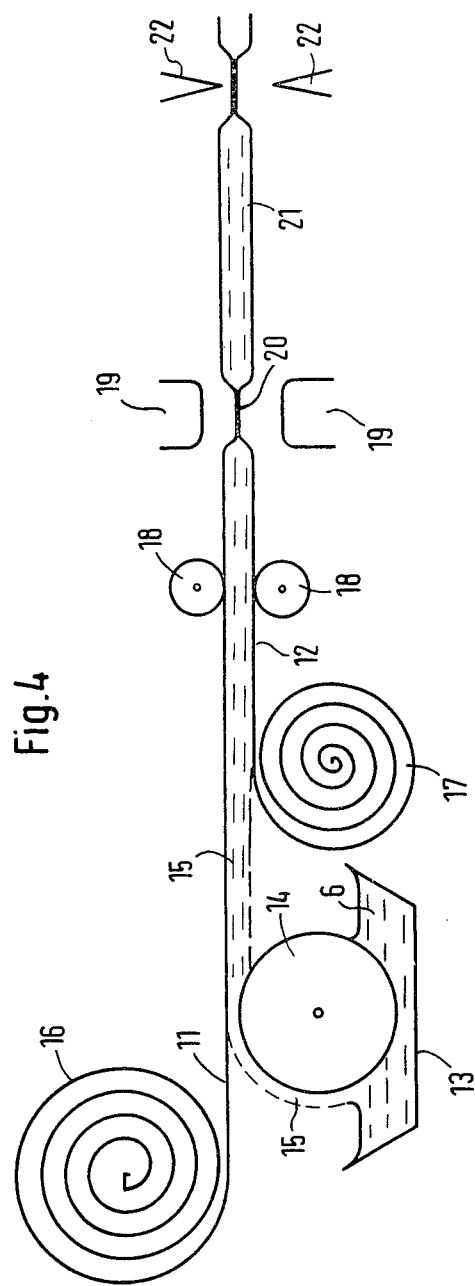

ELECTRO-OPTICAL DISPLAY

The present invention relates to an electro-optical display in which, between plates coated with conductors, of which at least one is made of a material permeable to light and coated with an electrode pattern likewise permeable to light, there is arranged one layer of a liquid or semi-liquid electro-optical material which, under the effect of an electric field, changes its optical properties, as well as to a method of manufacturing such a display.

Various types of electro-optical displays have already become known in which between two plates coated with conductors, there is arranged a thin layer of electro-optical material. Of the plates at least one is made of a material permeable to light, and the electrode arranged thereon is likewise permeable to light. One of the two electrodes consists of an electrode pattern, that is, of individual segments provided with electrical lead-in conductors. However, also the conductors on both plates may consist of electrode patterns. By applying a potential between two oppositely arranged electrode surfaces, there is produced an electric field causing the electro-optical material as disposed therebetween, to change its optical properties. One such optical change may consist in the change of the permeability to light, of a change of the reflecting properties, or else in a change of colour. As electro-optical material it is possible to use so-called liquid crystals, or else colloidal solutions changing their optical properties within the electric field.

Up to now the electro-optical material has been inserted between two rigid plates of glass or plastics material which, on the sides facing one another, were provided with the corresponding electrodes or electrode patterns. The electro-optical material must in this case be present in a very thin layer of a uniform as possible thickness. In manufacturing such displays, difficulties arise insofar as the plates have to be tightly sealed to one another at their edges, so as to prevent the electro-optical material from leaking out. Thus, for example, glass plates coatd with electrodes, are sealed at their edges by using a solder glass; this, however, requires the use of considerably high temperatures which can easily have an unfavourable influence upon the electro-optical material inserted between the glass plates. Moreover, with conventional types of electro-optical displays, the electrode material gets in contact with the electro-optical material, which is also likely to result in an unfavourable influence upon electro-optical material. The electrode material, therefore, cannot be selected alone with a view to its electrical properties, but also its influences upon the electro-optical material have to be taken into consideration. It is moreover known that the plate material coming into contact with the electro-optical material, has a considerable influence upon the electro-optical properties. Therefore, it is necessary in many cases to subject the inside of the plates to a special coating or depositing treatment, and to make sure that not any arbitrary plate material may be brought into contact with the electro-optical material.

Moreover, the conventional types of electro-optical displays cannot be opened so very easily in order e.g. to replace the electro-optical meterial or to recover the material in cases where a cell has become unserviceable.

Finally, it is difficult to insert a thin layer of electro-optical material between two rigid plates without entrapping air or forming air-pockets. Therefore, it has up to now only been possible to produce electro-optical displays consisting of flat plates, because the bubble-free insertion of electro-optical material between to two arched plates is entailled by very considerable difficulties.

It is the object of the invention to provide an electro-optical display in which the electro-optical material is separated from the plates coated with the electrodes. It is a further object of the invention to provide a method of manufacturing such a display.

According to the invention, the aforementioned object is achieved in that the electro-optical material is placed in a flat bag of transparent plastic material disposed between the plates.

In this way it is no longer necessary for the two plates to be sealed tightly to one another at their edges, and the electro-optical material is prevented from coming into contact with the material of the plates or the electrode material. The bag containing the electro-optical material can be easily replaced, and the electro-optical material can be easily recovered is cases where the display has otherwise come unserviceable.

Figure 2:
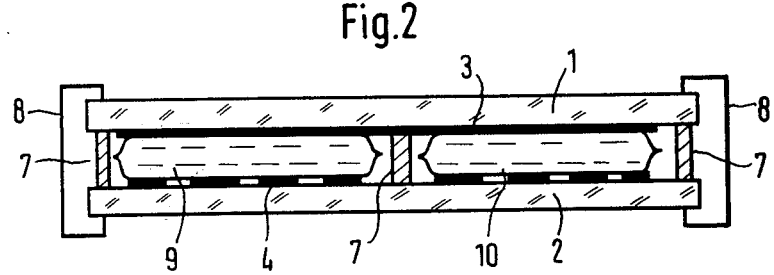
Figure 3:
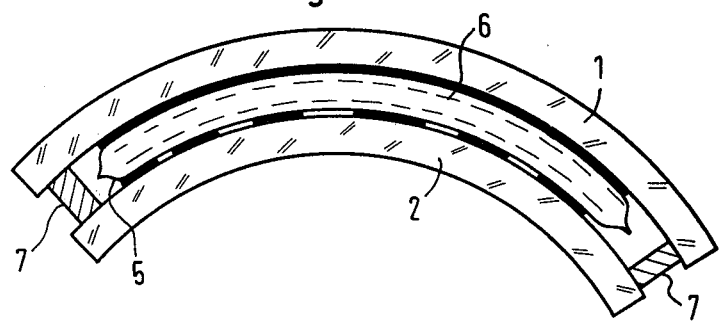

The invention will now be described in greater detail with reference to FIGS. 1 to 4 of the accompanying drawings, in which:

FIGS. 1 to 3, in sectional views, show different types of embodiments of the invention, and FIG. 4 schematically shows the method of manufacturing the bags filled with electro-optical material.

In the type of embodiment shown in FIG. 1, there are provided two plates 1 and 2 of transparent material, of which the plate 1 is coated with a continuous electrode 3 or with an electrode pattern, and of which the plate 2 is coated with an electrode pattern 4. Between the two plates 1 and 2 facing one another with their sides bearing the electrodes, there is disposed the plastics bag 5 containing the electro-optical material 6. This material 6 is contained in the tightly sealed bag 5 and thus comes neither in contact with the material of the electrodes 3 and 4 nor with the material of the plates 1 and 2. In manufacturing such a display, the bag 5 is placed between the plates 1 and 2 which are kept at a predetermined (defined) spaced relation by using spacing pieces 7. With the aid of suitable clamping devices 8, the two plates 1 and 2 are held together. The bag 5 is of very small thickness, so that, for example, the electro-optical material exists between the plates 1 and 2 in a layer thickness of about 50 microns. The electrodes 3 and 4 can be made of any suitable material selected in accordance with its electrical conductivity and for the purpose of achieving optimum contrast, i.e. may consist of a material such as copper, aluminum, gold, or the like. The electro-optical material 6 may be a liquid-crystal material or a corresponding colloidal suspension.

In the type of embodiment shown in FIG. 2, two bags 9 and 10 containing electro-optical material are disposed between the plates 1 and 2, with a further spacing piece 7 being provided for between the individual bags 9 and 10. Accordingly, in the case of large-area displays, spacing pieces may be provided for at several points between the plates, with these spacing pieces, owing to the subdivision of the electro-optical material into different bags lying next to each other, being prevented from coming into contact with the electro-optical material.

In this type of embodiment, various bags may also be filled with a different material or with a material of different colour. In this way it is very easy to obtain a display employing different electro-optical material.

FIG. 3 shows one arrangement according to the invention in which the two plates 1 and 2 are arched. Without the use of bags according to the invention it would only be possible with great difficulties to fill electro-optical material between two arched plates without causing the formation of entrapped air pockets. By using plastic bags filled with the electro-optical material it is also easily possible to manufacture displays employing arched plates.

FIG. 4 schematically shows part of the method of manufacturing electro-optical displays according to the invention. A foil sheeting 11 is rolled off a supply reel 16, which is coated with a layer 15 of electro-optical material 6 with the aid of the roller 14 dipping into the container 13. On to this layer there is placed the foil sheeting 12 as supplied by the reel 17, and with the aid of a sealing device 18, this foil sheeting 12 is continuously sealed along both edges to the first foil sheeting 11. At certain distances a transverse sealing 20 of the two foil edges 11 and 12 is carried out with the aid of the sealig device 19, so as to obtain individual flat bags 21 containing the electro-optical liquid. Within the welded seam 20, the individual bags are separated with the aid of a cutting device 22. The thus obtained bags are then inserted between two plates coated on their insides with corresponding electrodes and electrode patterns, as has been described already hereinbefore.

In this way it is very easy to manufacture electro-optical displays according to the invention.

What is claimed is:

1. Electro-optical display in which, between plates coated with conductors, of which at least one is made of a material permeable to light and coated with an electrode pattern likewise permeable to light, there is arranged one layer of a liquid or semi-liquid electro-optical material which, under the effect of an electric field, changes its optical properties, characterized in that the electro-optical material is contained in a flat bag of transparent plastic material arranged between the plates.

2. Electro-optical display as claimed in claim 1, characterized in that said bag consists of plastic foils which are sealed to one another along their edges.

3. Electro-optical display as claimed in claim 1, characterized in that several of said bags are arranged next to each other between two plates.

4. Electro-optical display as claimed in claim 3, characterized in that spacing pieces are arranged between the individual bags as disposed between said plates.

5. Electro-optical display as claimed in claim 1, 2, 3 or 4, characterized in that the individual bags contain electro-optical material of different composition and/or colour.

6. Electro-optical display as claimed in claim 1, 2, or 3, characterized in that said bags as filled with the electro-optical material, are disposed between arched plates.

7. Method of manufacturing electro-optical displays as claimed in claim 1 or 3, characterized in that said electro-optical material is permanently inserted between two endless foil sheetings which are permanently sealed at the edges in the longitudinal direction, that the two foil sheetings are sealed to one another at a certain spaced relation transversely in relation to the longitudinal direction, that the thus formed bags filled with electro-optical material, are cut off along the transverse sealings and inserted between two plates coated with conductors.

8. Method as claimed in claim 7, characterized in that the electro-optical material is in such a way inserted between the two foil sheetings that the electro-optical material is deposited in a thin layer continuously on the one foil sheeting whereupon the second foil sheeting is placed in position by avoiding air-pockets.

\* \* \* \* \*